(12) United States Patent
Zhao et al.

(10) Patent No.: US 10,710,842 B2
(45) Date of Patent: Jul. 14, 2020

(54) FIBER REINFORCED ELEVATOR BELT AND METHOD OF MANUFACTURE

(71) Applicant: OTIS ELEVATOR COMPANY, Farmington, CT (US)

(72) Inventors: Wenping Zhao, Glastonbury, CT (US); John P. Wesson, West Hartford, CT (US); Daniel A. Mosher, Glastonbury, CT (US); Scott Alan Eastman, Glastonbury, CT (US); Michael Paul Humbert, Manchester, CT (US); Mark Steven Thompson, Tolland, CT (US); Eric Jay Amis, Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 16 days.

(21) Appl. No.: 15/123,093

(22) PCT Filed: Mar. 6, 2014

(86) PCT No.: PCT/US2014/021135
§ 371 (c)(1),
(2) Date: Sep. 1, 2016

(87) PCT Pub. No.: WO2015/134025
PCT Pub. Date: Sep. 11, 2015

(65) Prior Publication Data
US 2017/0066629 A1 Mar. 9, 2017

(51) Int. Cl.
*B66B 7/06* (2006.01)
*B29D 29/00* (2006.01)
(Continued)

(52) U.S. Cl.
CPC .............. *B66B 7/062* (2013.01); *B29D 29/00* (2013.01); *B66B 7/1215* (2013.01); *B66B 9/00* (2013.01)

(58) Field of Classification Search
CPC .......... B29D 29/00; B29D 9/00; B66B 7/062; B66B 7/1215; B66B 9/00; B66B 7/1223;
(Continued)

(56) References Cited

U.S. PATENT DOCUMENTS 6,364,063 B1 4/2002 Aulanko et al.
6,653,943 B2 * 11/2003 Lamb .................... B66B 7/1223
324/513

(Continued)

FOREIGN PATENT DOCUMENTS

CN  101679003 A   3/2010
CN  102006988 A   4/2011
(Continued)

OTHER PUBLICATIONS

Extended European Search Report for EP Application No. 14884657.9; dated Oct. 13, 2017 (8 pages).
(Continued)

*Primary Examiner* — Camie S Thompson
(74) *Attorney, Agent, or Firm* — Cantor Colburn LLP

(57) ABSTRACT

A belt for suspending and/or driving an elevator car extending longitudinally along a length of the belt. An inner belt layer formed from a first material is bonded to the plurality of tension elements at a first side of the belt. The inner belt layer forms an inner belt surface interactive with a traction sheave of an elevator system. An outer belt layer formed from a second material is bonded to the plurality of tension elements at a second side of the belt. The plurality of tension elements are located between the first side and the second side.

15 Claims, 4 Drawing Sheets

(51) Int. Cl.
*B66B 7/12* (2006.01)
*B66B 9/00* (2006.01)

(58) Field of Classification Search
CPC ...... B29K 2105/08; D07B 1/162; D07B 1/22; D07B 1/145; D07B 5/006
USPC .............. 428/172, 299.1; 264/171.13, 171.3; 187/251, 391; 324/513; 73/158
See application file for complete search history.

(56) References Cited

U.S. PATENT DOCUMENTS

| | | |
|---|---|---|
| 2002/0092285 A1 | 7/2002 | Aulanko et al. |
| 2004/0065529 A1 | 4/2004 | Cediel et al. |
| 2010/0044158 A1 | 2/2010 | Goeser |
| 2011/0088981 A1 | 4/2011 | Urbani et al. |
| 2012/0195733 A1 | 8/2012 | Bruch et al. |
| 2012/0211310 A1 | 8/2012 | Peric et al. |
| 2012/0329591 A1 | 12/2012 | Goeser et al. |

FOREIGN PATENT DOCUMENTS

| | | |
|---|---|---|
| CN | 102569241 B | 3/2015 |
| CN | 15123093 A | 9/2016 |
| EP | 2570698 A2 | 3/2013 |
| WO | 2013105958 A1 | 7/2013 |

OTHER PUBLICATIONS

Notification of Transmittal of the International Search Report and the Written Opinion of the International Searching Authority, or the Declaration; Application No. PCT/US2014/021135; dated Nov. 26, 2014; 13 pages.

Chinese Office Action Issued in CN Application No. 201480076898.9, dated Mar. 20, 2018, 7 Pages.

* cited by examiner

FIBER REINFORCED ELEVATOR BELT AND METHOD OF MANUFACTURE

CROSS REFERENCE TO RELATED APPLICATIONS

This application is a National Phase Application of Patent Application PCT/US2014/021135 filed on Mar. 6, 2014, the entire contents of this application is incorporated herein by reference.

BACKGROUND OF THE INVENTION

The subject matter disclosed herein relates to belts utilized in elevator systems for suspension and/or driving of the elevator car and/or counterweight.

Conventional elevator systems use rope formed from steel wires as a lifting tension load bearing member. Other systems utilize a lifting belt formed from a number of steel cords, formed from steel wires, retained in an elastomeric jacket. The cords act as the load supporting tension member, while the elastomeric jacket holds the cords in a stable position relative to each other, and provides a frictional load path to provide traction for driving the belt.

More recent developments in the area of composites include the use synthetic fibers such as carbon fiber and glass fiber to provide a higher strength to weight ratio than steel. The fibers are first impregnated with thermoset resins and then cured to form rigid and brittle composite cords that are later surrounded with an elastomer to provide traction for the belt. Although a belt with carbon fiber and thermoset resin will provide improved strength to weight advantages compared to steel cord belt, significant manufacturing, performance and durability challenges exist. For example, the long curing cycle of the thermoset resin and entrapment of air voids during cure present a manufacturing challenge. Further, the rigid construction is contrary to the desire for a flexible belt capable of many thousands of bending cycles without brittle or fatigue failure in the field.

BRIEF DESCRIPTION OF THE INVENTION

In one embodiment, a belt for suspending and/or driving an elevator car includes a plurality of tension elements extending longitudinally along a length of the belt. An inner belt layer formed from a first material is bonded to the plurality of tension elements at a first side of the belt. The inner belt layer forms an inner belt surface interactive with a traction sheave of an elevator system. An outer belt layer formed from a second material is bonded to the plurality of tension elements at a second side of the belt. The plurality of tension elements are located between the first side and the second side.

Additionally or alternatively, in this or other embodiments, the first material is different from the second material.

Additionally or alternatively, in this or other embodiments, the tension elements include steel cords, carbon fiber, polymer fiber and/or glass fiber.

Additionally or alternatively, in this or other embodiments, the plurality of tension elements are at least partially enclosed in a matrix material.

Additionally or alternatively, in this or other embodiments, the inner belt layer includes a tape including the first material.

Additionally or alternatively, in this or other embodiments, the outer belt layer includes a tape including the second material.

Additionally or alternatively, in this or other embodiments, the inner belt layer and/or the outer belt layer are thermally bonded to the plurality of tension elements.

Additionally or alternatively, in this or other embodiments, the first material is one of high performance polymer fibers such as highly oriented thermoplastics (i.e. Dyneema®), aramids (i.e. Kevlar®), aromatic polyethers (i.e. PEEK, PEKK) or polyimides to enhance abrasive and wear resistance of the inner surface.

Additionally or alternatively, in this or other embodiments, the second material is selected to enhance one or more of moisture or UV resistance, fire resistance or vibration damping of the belt.

In another embodiment, a method of forming a belt for suspending and/or driving an elevator car includes arranging a plurality of tension elements to extend longitudinally along a belt length. An inner belt layer comprising a first material is applied to a first side of the plurality of tension elements to form an inner belt surface. An outer belt layer comprising a second material different from the first material is applied to a second side of the plurality of tension elements forming an outer belt surface. The plurality of tension elements are located between the inner belt surface and the outer belt surface.

Additionally or alternatively, in this or other embodiments, the plurality of tension elements are at least partially enclosed in a matrix material prior to applying the inner layer and/or the outer layer.

Additionally or alternatively, in this or other embodiments, the tension elements include steel cords, carbon fiber and/or glass fiber.

Additionally or alternatively, in this or other embodiments, the inner belt layer includes a tape including the first material.

Additionally or alternatively, in this or other embodiments, the outer belt layer includes a tape including the second material.

Additionally or alternatively, in this or other embodiments, the inner belt layer and/or the outer belt layer are thermally bonded to the plurality of tension elements.

The detailed description explains the invention, together with advantages and features, by way of examples with reference to the drawings.

DETAILED DESCRIPTION OF THE INVENTION

Figure 1A:
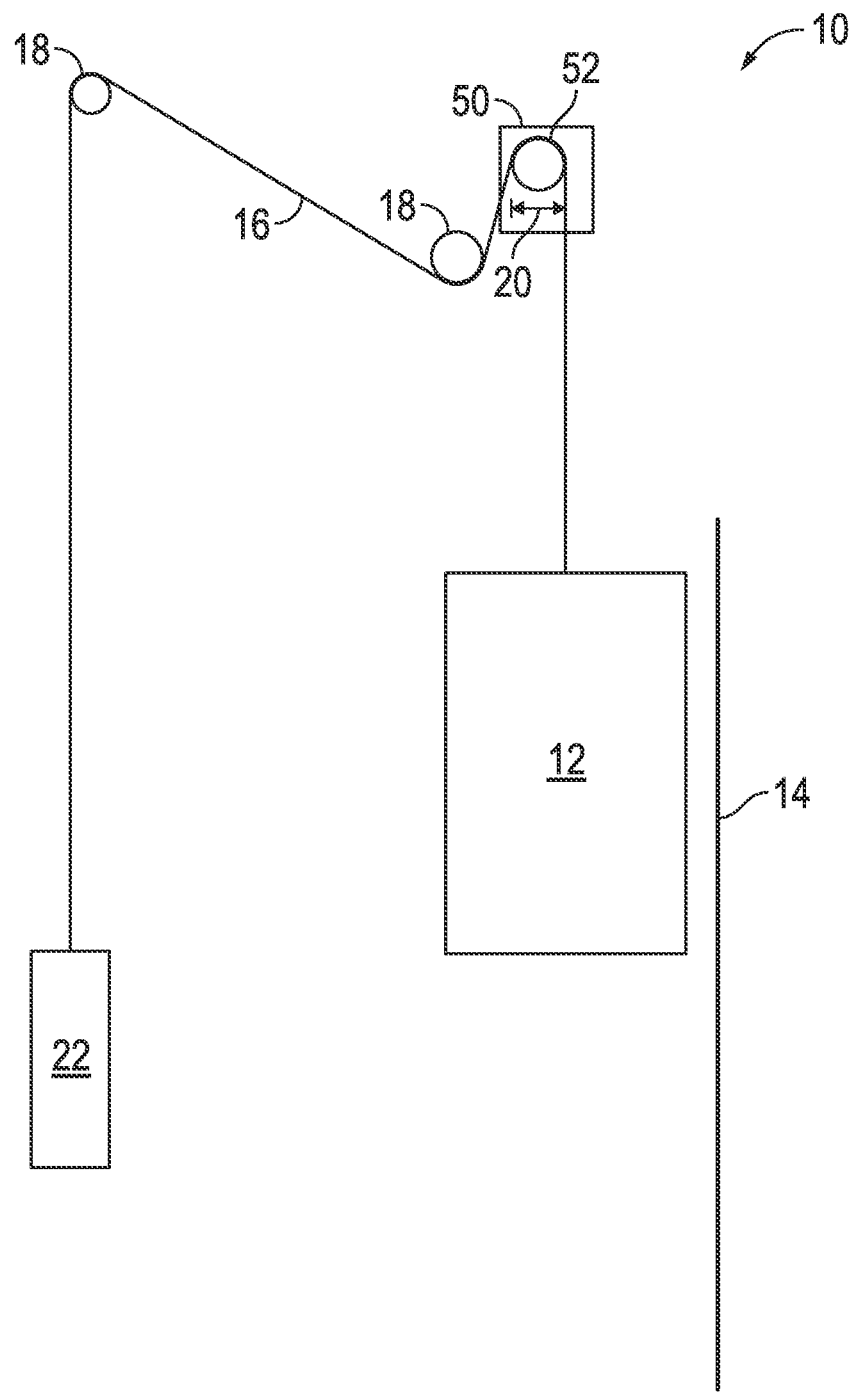
FIG. 1A is a schematic of an exemplary elevator system having a 1:1 roping arrangement.
Figure 1B:
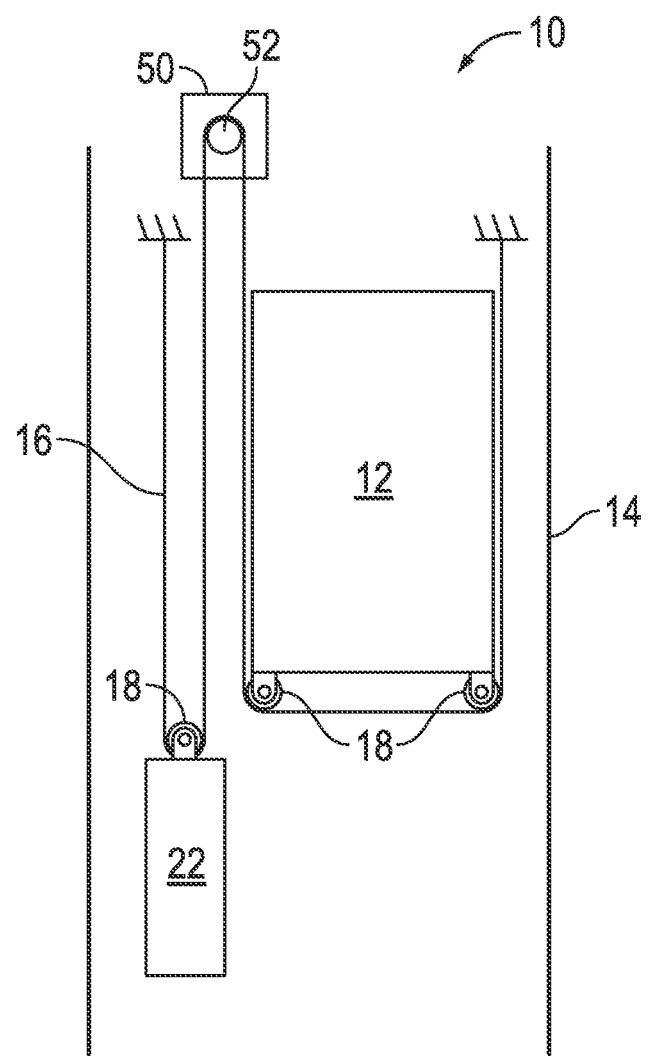
FIG. 1B is a schematic of another exemplary elevator system having a different roping arrangement.
Figure 1C:
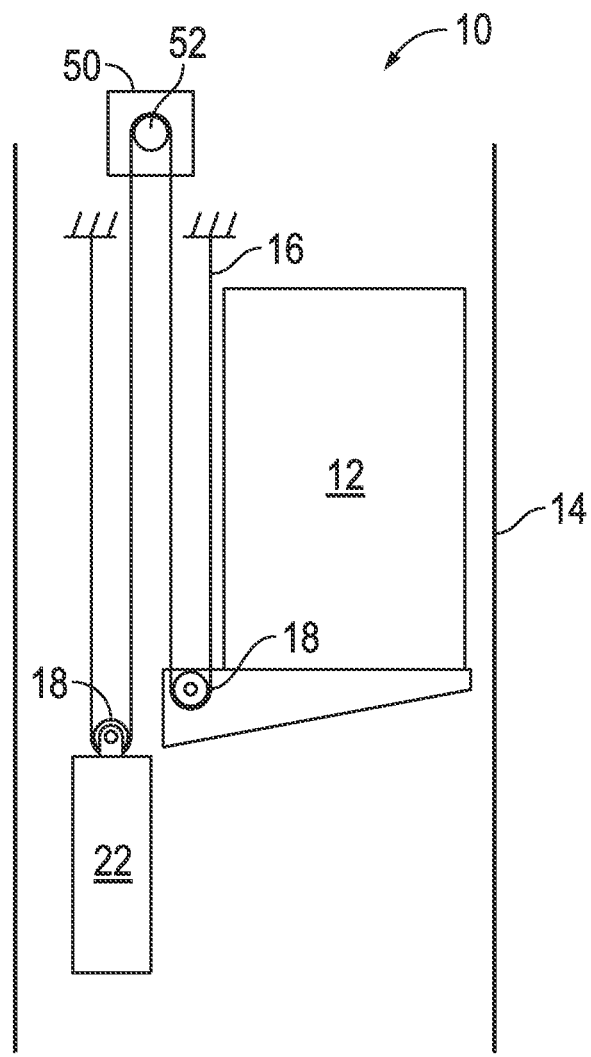
FIG. 1C is a schematic of another exemplary elevator system having a cantilevered arrangement.

Shown in FIGS. 1A, 1B and 1C are schematics of exemplary traction elevator systems 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more belts 16. The one or more belts 16 interact with one or more sheaves 18 to be routed around various components of the elevator system 10. The one or more belts 16 could also be connected to a counterweight 22, which is used to help balance the elevator system 10 and reduce the difference in belt tension on both sides of the traction sheave during operation.

The sheaves 18 each have a diameter 20, which may be the same or different than the diameters of the other sheaves 18 in the elevator system 10. At least one of the sheaves could be a traction sheave 52. The traction sheave 52 is driven by a machine 50. Movement of drive sheave by the machine 50 drives, moves and/or propels (through traction) the one or more belts 16 that are routed around the traction sheave 52.

At least one of the sheaves 18 could be a diverter, deflector or idler sheave. Diverter, deflector or idler sheaves are not driven by a machine 50, but help guide the one or more belts 16 around the various components of the elevator system 10.

In some embodiments, the elevator system 10 could use two or more belts 16 for suspending and/or driving the elevator car 12. In addition, the elevator system 10 could have various configurations such that either both sides of the one or more belts 16 engage the one or more sheaves 18 (such as shown in the exemplary elevator systems in FIG. 1A, 1B or 1C) or only one side of the one or more belts 16 engages the one or more sheaves 18.

FIG. 1A provides a 1:1 roping arrangement in which the one or more belts 16 terminate at the car 12 and counterweight 22. FIGS. 1B and 1C provide different roping arrangements. Specifically, FIGS. 1B and 1C show that the car 12 and/or the counterweight 22 can have one or more sheaves 18 thereon engaging the one or more belts 16 and the one or more belts 16 can terminate elsewhere, typically at a structure within the hoistway 14 (such as for a machineroomless elevator system) or within the machine room (for elevator systems utilizing a machine room. The number of sheaves 18 used in the arrangement determines the specific roping ratio (e.g. the 2:1 roping ratio shown in FIGS. 1B and 1C or a different ratio). FIG. 1C also provides a so-called rucksack or cantilevered type elevator. The present invention could also be used on elevator systems other than the exemplary types shown in FIGS. 1A, 1B and 1C.

The belts 16 are constructed to have sufficient flexibility when passing over the one or more sheaves 18 to provide low bending stresses, meet belt life requirements and have smooth operation, while being sufficiently strong to be capable of meeting strength requirements for suspending and/or driving the elevator car 12.

Figure 2:
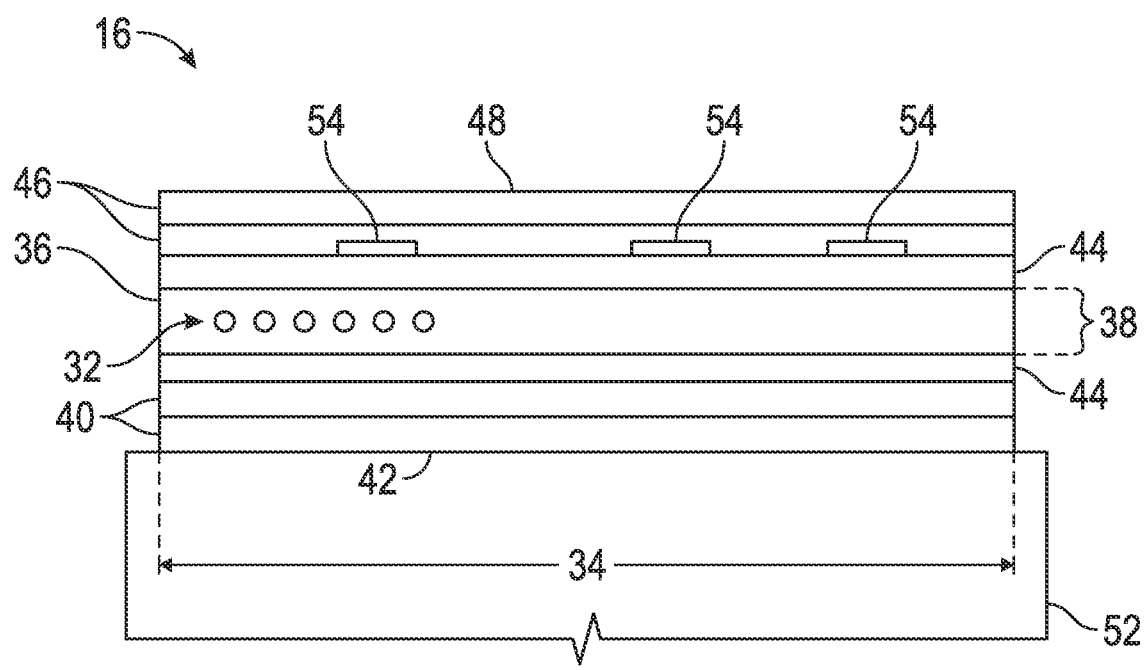
FIG. 2 is a cross-sectional view of an embodiment of an elevator belt.

FIG. 2 provides a schematic of an exemplary belt 16 construction or design. The belt 16 includes a plurality of tension elements 32 extending longitudinally along the belt 16. The tension elements 32 may be cords formed from steel wires, or may be formed from other materials such as carbon fiber, polymer fiber such as aramid fiber and/or glass fiber. The tension elements 32 are arrayed laterally across a width 34 of the belt 16 and, as stated above, extend longitudinally along a belt length. In some embodiments, a binder or matrix 36 is disposed around the tension elements 32 to retain the tension elements 32 in selected positions relative to each other. In some embodiments, the matrix 36 is formed from a thermoplastic polymer such as nylon, PP (polypropylene), PET (polyethylene terephthalate), PEI (polyetherimide), or PEEK (polyether ether ketone). Fillers and/or modifiers may be added to the matrix 36 to enhance select properties of the matrix such as strength, durability, and/or frictional properties.

The belt 16 construction is a laminate construction, with the tension elements 32 disposed at a middle portion 38 of the belt 16, in some embodiments substantially at a center of the belt 16, and layers of additional material disposed on the tension element 32 layer to form the remainder of the belt 16. This construction of the belt 16 allows for use of different materials in discrete layers of the belt 16, and selection of those materials based on selected properties for those layers. For example, in the embodiment shown in FIG. 2, one or more inner layers 40 forming an inner or traction surface 42 of the belt 16, are applied to the tension members 32 and are formed from materials selected for their abrasive and wear resistance as the traction surface 42 interacts with the traction sheave 52 to drive the elevator system 10. Materials suitable for the inner layers 40 include performance polymer such as highly oriented thermoplastics (i.e. Dyneema®), aramids (i.e. Kevlar®), aromatic polyethers (i.e. PEEK, PEKK) polyimides, urethanes and other abrasion resistant polymers.

In the middle portion 38 of the belt 16 a number of middle layers 44 may be included, in addition to or instead of the tension elements 32. The middle layers 44 are formed form materials having high stiffness and high strength, especially high tensile strength. Materials utilized for the middle layers 44 include carbon fiber. In addition, the carbon fiber material would utilize fine fibers to maintain high tensile stiffness of the middle layers 44 while having relatively low bending stiffness to prevent the belt 16 from having a high rigidity.

The belt 16 also includes one or more outer layers 46, forming an outer surface 48 opposite the traction surface 42. The outer layers 46 may be formed from the same materials as the inner layers 40, or alternatively may be formed from other materials that are, for example, more cost effective than those of the inner layers 40, or materials having other properties to enhance performance of the belt 16. For example, the outer layers 46 may be formed of materials providing environmental protection such as moisture or UV resistance, or fire resistance or vibration damping. Materials that may be utilized for fire resistance include fiberglass mesh, Kevlar® or aluminum mesh. It is to be appreciated that such environmental protection materials may also be utilized in the inner layers 40. In addition to or instead of environmental protection, the outer layers 46 may include materials or sensors 54 embedded therein to monitor the health or condition of the tension elements 32. The sensors 54 may periodically transmit information regarding the condition of the tension elements 32 to a control system (not shown). In one embodiment, one or more sensors 54 are disposed between the middle layer 44 and the outer layer 46 to monitor health of the plurality of tension elements 32.

Figure 3:
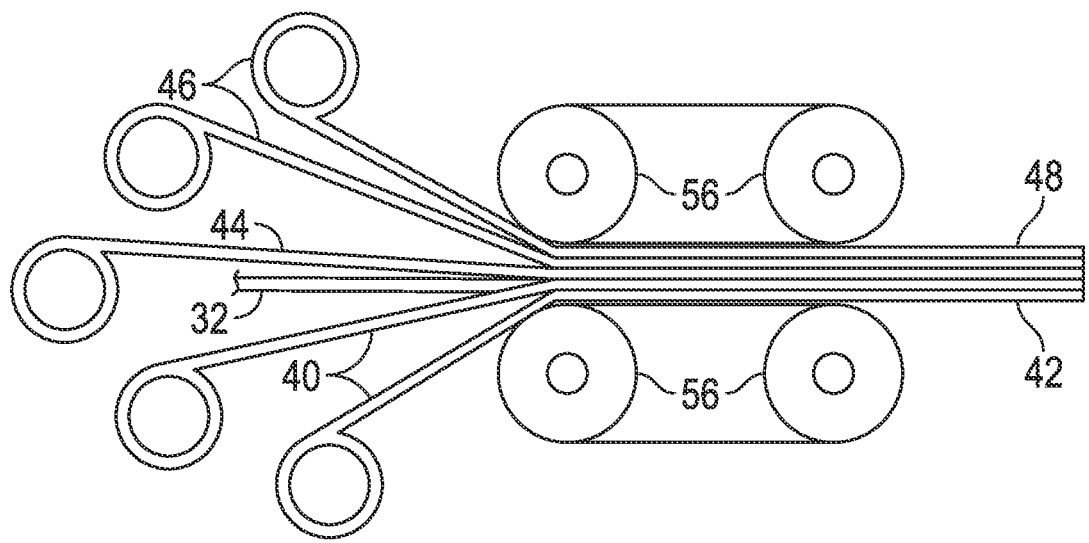
FIG. 3 is schematic view of an embodiment of a manufacturing process for an elevator belt.

Referring now to FIG. 3, a schematic illustration of a manufacturing process for a belt 16 is illustrated. Each layer 40, 44, 46 is formed using preformed tapes, with the functional material of the layer formed into the tape with a tape matrix material. As with matrix 36, the tape matrix material may be a thermoplastic polymer such as nylon, PP, PET, PEI or PEEK. The tapes are then consolidated into the belt 16 as shown by a continuous manufacturing process. The process utilizes one or more sets of forming rollers 56 through which the tapes forming layers 40, 44 and 46, along with tension members 32 are passed. The rollers 56 apply pressure to the structure. To cure the belt 16 in embodiments here the tape matrix is a thermoplastic polymer, for example, the structure is then heated to adhere the layers 40, 44, 46 to each other. In other embodiments, adhesives or other means may be utilized to adhere the layers 40, 44, 46 to each other.

The structure and manufacturing process of the belt 16 disclosed herein allows for tailor of belt 16 properties to achieve a wide variety of functional requirements, and in some embodiments allows for health monitoring of the belt. The materials may be selected to improve functional life of the belt 16. Each layer of the belt may be tailored for specific requirements without significant changes to the manufacturing process or to other layers of the belt. Further, the continuous manufacturing process reduces manufacturing cost of the belt.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A belt for suspending and/or driving an elevator car, comprising:
   a plurality of tension elements extending longitudinally along a length of the belt;
   an inner belt layer formed from a first material bonded to the plurality of tension elements at a first side of the belt, the inner belt layer forming an inner belt surface interactive with a traction sheave of an elevator system;
   an outer belt layer formed from a second material bonded to the plurality of tension elements at a second side of the belt, the plurality of tension elements disposed between the first side and the second side;
   a middle belt layer disposed between the plurality of tension members and the outer belt layer; and
   one or more sensors disposed between the middle belt layer and the outer belt layer to monitor health of the plurality of tension members.

2. The belt of claim 1, wherein the first material is different from the second material.

3. The belt of claim 1, wherein the tension elements comprise steel cords, carbon fiber, polymer fiber and/or glass fiber.

4. The belt of claim 1, wherein the plurality of tension elements are at least partially enclosed in a matrix material.

5. The belt of claim 1, wherein the inner belt layer comprises a tape including the first material.

6. The belt of claim 1, wherein the outer belt layer comprises a tape including the second material.

7. The belt of claim 1, wherein the inner belt layer and/or the outer belt layer are thermally bonded to the plurality of tension elements.

8. The belt of claim 1, wherein the first material is one of high performance polymer fibers including highly oriented thermoplastics, aramids, aromatic polyethers (i.e. PEEK, PEKK) or polyimides to enhance abrasive and wear resistance of the inner surface.

9. The belt of claim 1, wherein the second material is selected to enhance one or more of moisture or UV resistance, fire resistance or vibration damping of the belt.

10. A method of forming a belt for suspending and/or driving an elevator car comprising:
    arranging a plurality of tension elements to extend longitudinally along a belt length;
    applying an inner belt layer comprising a first material to a first side of the plurality of tension elements to form an inner belt surface;
    applying an outer belt layer comprising a second material different from the first material to a second side of the plurality of tension elements forming an outer belt surface, the plurality of tension elements disposed between the inner belt surface and the outer belt surface;
    positioning a middle belt layer between the plurality of tension members and the outer belt layer; and
    locating one or more sensors between the middle belt layer and the outer belt layer to monitor health of the plurality of tension members.

11. The method of claim 10, further comprising at least partially enclosing the plurality of tension elements in a matrix material prior to applying the inner layer and/or the outer layer.

12. The method of claim 10, wherein the tension elements comprise steel cords, carbon fiber, polymer fiber and/or glass fiber.

13. The method of claim 10, wherein the tension elements comprise steel cords, carbon fiber, polymer fiber and/or glass fiber.

14. The method of claim 10, wherein the outer belt layer comprises a tape including the second material.

15. The method of claim 10, wherein the inner belt layer and/or the outer belt layer are thermally bonded to the plurality of tension elements.

* * * * *